Figure 1:
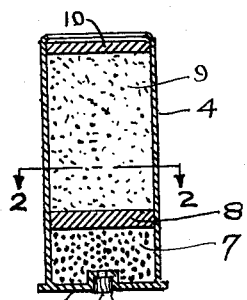

Jan. 30, 1945.  E. P. MARLMAN  2,368,368

POISON MIXTURES FOR TRAP GUN CARTRIDGES

Filed Feb. 23, 1943

ETHEL P. MARLMAN
*INVENTOR.*

BY Martin E. Anderson
ATTORNEY

Patented Jan. 30, 1945

2,368,368

UNITED STATES PATENT OFFICE 2,368,368

POISON MIXTURE FOR TRAP GUN CARTRIDGES

Ethel P. Mariman, Las Animas, Colo., assignor to The Humane Coyote Getter Inc., Los Animas, Colo., a corporation of Colorado Application February 23, 1943, Serial No. 476,855

4 Claims. (Cl. 167—46)

This invention relates to improvements in poison mixtures for cartridges of the type used in trap guns, such as that disclosed and claimed in United States Letters Patent No. 2,059,127, granted to me on October 27, 1936.

In the patent above identified a trap gun is disclosed in which a quick acting poison, such as cyanide, is shot from a shell into the mouth of an animal to be killed, instead of a bullet.

In my Patent No. 2,166,168, granted to me on July 18, 1939, a poison mixture for use in connection with trap guns is disclosed and claimed.

The mixture that forms the subject of the last mentioned patent has been extensively used with good results. However, it has been found that due to the hygroscopic properties of the materials employed, the pulverulent poison mixture in the cartridge will, if the cartridge is exposed for a sufficiently long time to atmosphere containing moisture, absorb sufficient moisture to cause the mixture to cake and for this reason cartridges that have been kept for a considerable length of time, may occasionally fail to function.

It is the object of this invention to produce an improved mixture for use in poison cartridges of the type above indicated, which shall be of such composition that it will not absorb moisture and will therefore keep indefinitely.

Another object of the invention is to produce a poison mixture of such composition and possessing such physical characteristics that it will adhere to the surfaces of the mouth of the animal after having been discharged thereinto, and which will therefore retain its effectiveness.

In addition to the objectionable hygroscopic properties of the powdered poison disclosed and claimed in the above identified patent, it has also been found that after this powder has been discharged into the mouth of an animal, it causes the latter to cough and such portions of the powder that have not become wetted by contact with the mucous surfaces are expelled.

A further object of the present invention is to produce a poison mixture of such characteristics that practically no part thereof will be expelled by any effort on the part of the animal.

This invention, briefly described, consists in forming a poison mixture comprising an alkali cyanide, such as sodium cyanide or potassium cyanide and an oil, the two parts being intimately mixed so as to form a paste that will not harden and which will plaster itself against the mucous surfaces when discharged from the cartridge.

Figure 2:
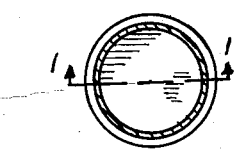

Having thus described the object of the invention and in a general way the invention itself, the latter will now be described in greater detail, and for this purpose reference will be had to the accompanying drawing in which:

Figure 1 represents a diametrical section of a cartridge, taken on line 1—1, Figure 2; and Figure 2 is a transverse section taken on line 2—2, Figure 1.

In the drawing a usual form of cartridge has been illustrated in section. This cartridge has a closed end 3 and a cylindrical wall 4. The closed end is provided with a recess 5, for the reception of a primer 6. A small quantity of powder 7 is positioned in the bottom of the cartridge or shell and covered with a wadding 8 which should preferably be made from some oil impervious material and for this purpose synthetic rubber or reclaimed rubber may be employed, but where this is not available, paper or fiber impregnated with an oil repellent material may be used. On top of the wadding 8, the poison mixture 9 is positioned. In the present case the mixture 9 consits of a quantity of sodium or potassium cyanide mixed with a nonacid oil such as a mineral oil that is extensively sold under the name of "Russian mineral oil." Instead of a simple mineral oil, it is possible to use a capsicum oil, in which case the capsicum in the oil serves as a mouth irritant that causes the animal to stop in an effort to dislodge the poison and which therefore prevents it from running too far away from the gun to be readily found after it has been poisoned. The outer end of the cartridge is closed by a suitable wadding 10, which should also be nonpermeable to oil.

In addition to the mineral oil some strong pepper such as capsicum or ordinary black pepper, may be mixed with the poison paste for the purpose above indicated and outlined in Patent No. 2,166,168.

It is quite necessary that the oil shall be nonacid as an acid oil will react with the alkali cyanide. Instead of the ordinary mineral oil used for medical purposes it is possible to employ other mineral oils, such as are used for the lubrication of internal combustion engines; however, due to the comparatively small amount of oil employed the better oil can be used without appreciably adding to the cost of the cartridges.

When a cartridge constructed in the manner above described is employed in trap guns, the paste containing the poison will become plastered over the mucous surfaces of the animal's mouth and cannot be dislodged by coughing, as sometimes is done when a dry powder is employed. The noncaking properties of this mixture, together with its increased effectiveness, makes cartridges of this construction very desirable because they can be kept an unlimited length of time without deterioration and due to the paste-like form of the poison employed, their effectiveness is also greatly increased.

Since the poison mixture is a paste, the exact proportions of the parts employed are indeterminate, but sufficient poison should be used to form a paste that will be of such consistency that it will not penetrate the mucous surfaces, but spread itself over them. It is apparent that if the mixture is sufficiently rigid to retain its shape for any appreciable length of time, it will act as a solid and penetrate the mucous surfaces and it must, therefore, be mixed sufficiently thin to prevent penetration to any appreciable degree.

In the above description, the mixture of cyanide and oil has been referred to as being of the consistency of a paste. Such paste-like mixture is desirable, but the consistency of the mixture varies with the kind of oil or grease employed, and where a thin mineral oil is used, the mixture, instead of having the characteristics of a paste, is more or less crumbly. However, if the cyanide is mixed with a heavy oil like vaseline, a paste is formed which has the advantages above pointed out.

Having described the invention what is claimed as new is:

1. A poison mixture for use in the loading of cartridges for trap guns of the type that discharges into the mouth of an animal to be killed, comprising a mixture of an alkali cyanide and a mineral oil in such proportions as to form a soft paste.

2. A poison mixture for use in the loading of cartridges for trap guns of the type that discharges into the mouth of an animal to be killed, comprising a mixture of an alkali cyanide and vaseline in such proportions as to form a soft paste.

3. A mixture in accordance with claim 1 containing an irritating pepper.

4. A mixture in accordance with claim 2 containing an irritating pepper.

ETHEL P. MARLMAN.